P. L. DESPREZ.
OUTER COVER FOR PNEUMATIC TIRES.
APPLICATION FILED MAY 28, 1907.
909,992.
Patented Jan. 19, 1909.
2 SHEETS—SHEET 1.
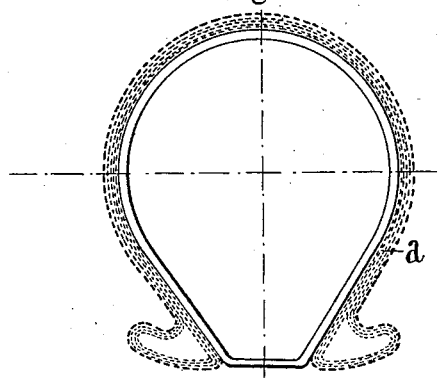
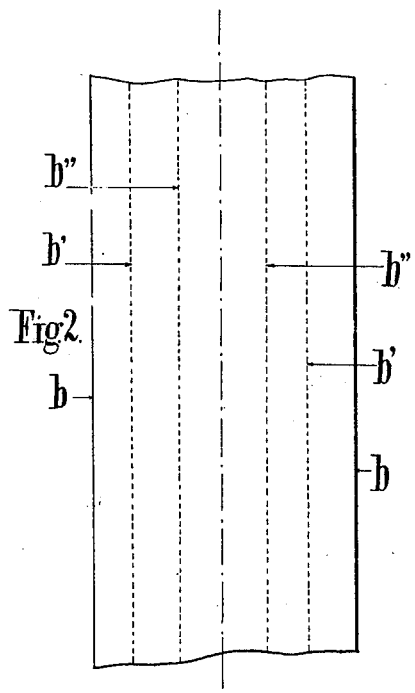
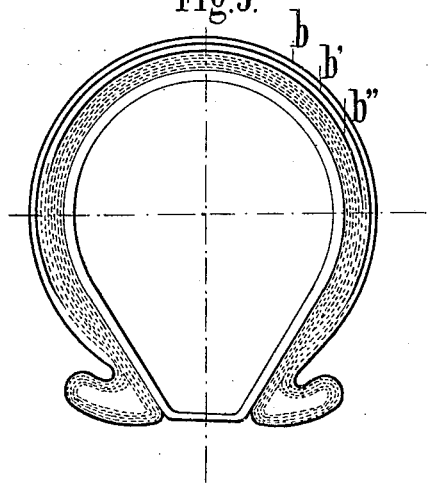

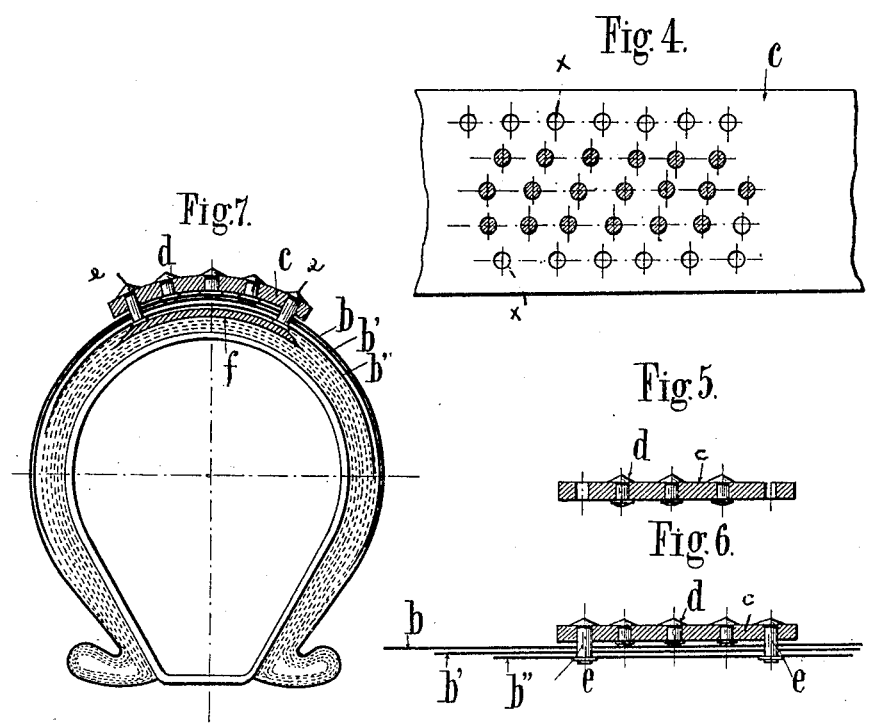

UNITED STATES PATENT OFFICE.

PAUL LANSADE DESPREZ, OF LYON, FRANCE.

OUTER COVER FOR PNEUMATIC TIRES.

No. 909,992. Specification of Letters Patent. Patented Jan. 19, 1909.

Application filed May 28, 1907. Serial No. 376,213.

*To all whom it may concern:*

Be it known that I, PAUL LANSADE DESPREZ, a citizen of the Republic of France, and resident of Lyon, France, have invented a new and useful Outer Cover for Pneumatic Tires, which is fully set forth in the following specification.

The invention relates to an outer cover for pneumatic tires.

My object is to provide a tire which will resist puncture, will be anti-skidding and which will not become heated.

In the drawings:—Figure 1 is a sectional view of the foundation or main frame of the tire; Fig. 2 is a plan view of a series of bands spread out flat and intended to be applied to the tread of the tire; Fig. 3 is a sectional view of a tire built up of the parts shown in Figs. 1 and 2; Fig. 4 is a plan view of an additional tread strip shod with rivet-like pieces which are shown in section; Fig. 5 is a sectional view of the part shown in Fig. 4; Fig. 6 is a sectional view of the reinforcing strip of Figs. 4 and 5 applied to the bands, and Fig. 7 is a sectional view of the complete tire.

The foundation tube $a$ may be that which is ordinarily found on the market composed of layers of non-tearing fabrics and rubber or cement, or the fabric layers may be covered with cork and connected by rubber or other cement. This foundation tube $a$ is covered by a plurality of layers $b$, $b'$, $b''$ shown in Figs. 2 and 3 of different widths, the one marked $b$ being of sufficient width to extend over the whole foundation tube to the heels or side flanges thereof, as shown in Fig. 3. The other bands $b'$ $b''$, of less width, are arranged so that the central portion of the cover will present jointly a thickened part at the tread. The bands $b$, $b'$ $b''$ may be composed of fabric coated either on one or both faces with cork. The bands being laid with their longitudinal centers at the center of the tread, extend with their side portions extending equally at both sides, and these side edges are trimmed down, or tapered, to a fine edge to prevent any irregularities.

The form of the layers when joined and previous to application to the foundation tube is illustrated in Fig. 2. In addition to these layers I employ a tread $c$ made up of layers of fabric and cork vulcanized together. This tread may have nails or metal points $d$ embedded therein, these being held in place by riveting. The tread, with these metal points in section, is shown in Fig. 4. This figure also shows two rows of holes $x$, one near each edge and through them and the layers $b$, $b'$, $b''$ the rivets $e$ extend, which binds all of these layers to the tread.

Before cementing the reinforcing means represented by Fig. 6 to the foundation tube $a$, I insert between this reinforcing means and the foundation tube $a$ a band $f$ made of fabric coated with cork on both sides. This band protects the foundation tube $a$ from the rivets $e$.

The reinforcing layer shown as a whole in Fig. 6 is now cemented to the foundation tube and vulcanization can now be effected. The outer cover thus formed is finally provided on the inside with leaves of cork, or with fabric coated with cork, as shown in Fig. 7 to prevent the slipping of the inner tube and consequent heating.

Instead of sheets of cork in combination with the layers of fabric, I may use a coating made of rubber and cork powder.

I claim:—

An outer cover for pneumatic tires consisting of a number of bands of non-tearing fabric having a cork coating, said bands being of different widths and disposed in relation to each other so that the greater thickness will be at the tread, a tread band on the outer side of the layers of fabric composed of layers of fabric and cork, metal rivets in the said tread, means for securing the said tread to the plurality of bands, a foundation tube to which the bands and tread are applied, a cork coating for the inner side of the said foundation tube, and a band of cork coated fabric between the foundation tube and the rivets, substantially as described.

In testimony whereof I have signed this specification in the presence of two subscribing witnesses.

PAUL LANSADE DESPREZ.

Witnesses:
J. MAILLOT,
MARIN VACHORY.